(12) United States Patent
Feng et al.

(10) Patent No.: US 10,756,386 B2
(45) Date of Patent: Aug. 25, 2020

(54) LITHIUM ION BATTERY AND METHOD FOR PREPARING THE SAME

(71) Applicant: QINGTAO (KUNSHAN) ENERGY DEVELOPMENT CO., LTD., Kunshan, Jiangsu (CN)

(72) Inventors: Yuchuan Feng, Jiangsu (CN); Zheng Li, Jiangsu (CN); Hongcai He, Jiangsu (CN); Jingliang Liu, Jiangsu (CN); Weiqiang Xiong, Jiangsu (CN); Fan Yang, Jiangsu (CN); Cewen Nan, Jiangsu (CN)

(73) Assignee: QINGTAO (KUNSHAN) ENERGY DEVELOPMENT CO., LTD., Kunshan (CN)

( * ) Notice: Subject to any disclaimer, the term of this patent is extended or adjusted under 35 U.S.C. 154(b) by 98 days.

(21) Appl. No.: 16/158,332

(22) Filed: Oct. 12, 2018

(65) Prior Publication Data
US 2019/0190059 A1   Jun. 20, 2019

(30) Foreign Application Priority Data
Dec. 14, 2017   (CN) .......................... 2017 1 1343201

(51) Int. Cl.
| | |
|---|---|
| *H01M 10/0525* | (2010.01) |
| *H01M 10/0585* | (2010.01) |
| *H01M 2/16* | (2006.01) |
| *H01M 4/04* | (2006.01) |
| *H01M 10/0565* | (2010.01) |
| *H01M 4/139* | (2010.01) |
| *H01M 10/42* | (2006.01) |

(Continued)

(52) U.S. Cl.
CPC ......... *H01M 10/0525* (2013.01); *H01M 2/16* (2013.01); *H01M 2/1673* (2013.01); *H01M 4/0404* (2013.01); *H01M 4/139* (2013.01); *H01M 10/058* (2013.01); *H01M 10/0565* (2013.01); *H01M 10/0568* (2013.01); *H01M 10/0585* (2013.01); *H01M 10/4235* (2013.01); *H01M 2/168* (2013.01)

(58) Field of Classification Search
CPC .......... H01M 10/0525; H01M 2/1673; H01M 4/0404; H01M 10/4235; H01M 10/0565; H01M 10/058
See application file for complete search history.

(56) References Cited

U.S. PATENT DOCUMENTS

| | | | | |
|---|---|---|---|---|
| 2013/0255074 A1* | 10/2013 | Uchida | ................. | H01M 4/139 29/623.5 |
| 2014/0154579 A1* | 6/2014 | Takahata | ............... | H01M 4/366 429/231.8 |

(Continued)

*Primary Examiner* — Stewart A Fraser

(57) ABSTRACT

The present invention provides a lithium ion battery including a lithium ion battery body. The lithium ion battery body includes a positive electrode sheet, a separator, a cushion rubber and a solid-state negative electrode sheet. The positive electrode sheet and the solid-state negative electrode sheet are provided at upper and lower surfaces of the separator. The cushion rubber is located in the positive electrode sheet and the separator. The present invention further provides a method for preparing a lithium ion battery including the preparation of the positive electrode sheet, the preparation of the solid-state negative electrode sheet and the preparation of the cushion rubber.

7 Claims, 4 Drawing Sheets

(51) Int. Cl.
*H01M 10/058* (2010.01)
*H01M 10/0568* (2010.01)

(56) References Cited

U.S. PATENT DOCUMENTS

2014/0170501 A1* 6/2014 Takahata ............ H01M 4/1393
　　　　　　　　　　　　　　　　　429/231.8
2016/0172677 A1* 6/2016 Shimura ............ H01M 4/0404
　　　　　　　　　　　　　　　　　429/126

* cited by examiner

LITHIUM ION BATTERY AND METHOD FOR PREPARING THE SAME

CROSS-REFERENCE TO RELATED APPLICATIONS

The present application claims priority to Chinese Patent Application number CN 201711343201.1 filed on Dec. 14, 2017, which is incorporated by reference herein in its entirety.

FIELD OF THE INVENTION

The present invention generally relates to the field of new energy and, more particular, relates to a lithium ion battery and method for preparing the same.

BACKGROUND OF THE INVENTION

Lithium ion batteries have the advantages of large specific energy, high specific power, low self-discharge, no memory effect, good cycle performance, high discharge efficiency and no environmental pollution. Therefore, lithium ion batteries are widely accepted and applied in the market. However, in the extreme cases of puncture and short circuit, conventional liquid lithium ion batteries in the market may cause fire, explosion and other safety accidents due to thermal runaway.

In recent years, all-solid-state lithium batteries having intrinsic safety have received widespread attention, and have been recognized as important development directions for next-generation batteries. However, most all solid-state batteries use lithium metal as negative electrode material. Metal Li produces lithium dendrites in cycle process, which not only reduces the amount of lithium available for insertion/desorption, but also causes safety problems, such as short circuit. At the same time, the active metal Li is ready to react with oxygen and moisture in the air, and the metal Li cannot resist high temperature, which brings difficulties to assembly and application of the batteries. Therefore, it is still a great challenge to use metal lithium for mass production at present.

In addition, due to the prominent interface problems in the solid-state batteries, the rate performance of a solid-state battery is poor. The lithium batteries that currently reported generally have good performances at 0.2 C and below.

SUMMARY OF THE INVENTION

One object of the present invention is to provide a lithium ion battery having high safety performance and good rate performance and method for preparing the same.

According to one embodiment of the present invention, a lithium ion battery is provided. The lithium ion battery includes a lithium ion battery body. The lithium ion battery body includes a positive electrode sheet, a separator, a cushion rubber and a solid-state negative electrode sheet. The positive electrode sheet and the solid-state negative electrode sheet are provided at upper and lower surfaces of the separator, and the cushion rubber is located in the positive electrode sheet and the separator.

According to one aspect of the present invention, the separator is a polyolefin-containing separator, such as a single-layer separator of PP, a single-layer separator of PE, a separator of PP coated with ceramic, a separator of PE coated with ceramic, a double-layer separator of PP/PE, a double-layer separator of PP/PP, and a triple-layer separator of PP/PE/PP.

According to one embodiment of the present invention, a method for preparing a lithium ion battery is provided. The method includes the steps of:

(1) coating a cushion rubber on a positive electrode sheet, and the cushion rubber infiltrating into the positive electrode sheet, wherein a mass ratio of the cushion rubber to the positive electrode sheet is 2%-25%;

(2) attaching a separator to the coated cushion rubber and putting the separator coated with cushion rubber on the positive electrode sheet, and the cushion rubber infiltrating into the separator, wherein a mass ratio of the cushion rubber to the separator is 30%-120%; and (3) attaching a solid-state negative electrode sheet to the separator to form a lithium ion battery body;

wherein preparation of the positive electrode sheet includes the steps of:

i) weighing a positive active material, Super P, polyvinylidene fluoride according to a mass ratio of (80-99):(0.5-10):(0.5-10);

ii) mixing the positive electrode active material, Super P, polyvinylidene fluoride in a solvent of N-methylpyrrolidone, stirring to form a uniform positive electrode slurry having a solid content of 50%-80%;

iii) coating the positive electrode slurry obtained in step 2) onto an aluminum foil or a carbon coated aluminum foil having a thickness of 6-25 μm to obtain a positive electrode sheet, drying the positive electrode sheet at a temperature of 110° C.-150° C. and a transport speed of 0.5-20 m/min, and obtaining the positive electrode sheet after rolling and cutting;

wherein preparation of the solid-state negative electrode sheet includes the steps of:

i) weighing a negative electrode active material, Super P, an additive, a lithium salt and polyvinylidene fluoride according to a mass ratio of (80-90):(1-5):(5-12):(2-10):(2-5);

ii) mixing the negative electrode active material, Super P, the additive, the lithium salt, polyvinylidene fluoride in a solvent of N-methyl pyrrolidone, stirring to form a uniform negative electrode slurry having a solid content of 30%-60%;

iii) coating the slurry obtained in step ii) onto a copper foil having a thickness of 6-25 μm to obtain a negative electrode sheet, drying the negative electrode sheet at a temperature of 90° C.-130° C. and a transport speed of 0.5-20 m/min, and obtaining the solid-state negative electrode sheet after rolling and cutting; and wherein preparation of the cushion rubber includes the step of mixing a solvent, the lithium salt and the additive according to a mass ratio of (80-90):(5-15):(1-10), fully stirring and obtaining the cushion rubber.

According to one aspect of the present invention, the lithium salt includes one or more of lithium perchlorate ($LiClO_4$), lithium hexafluoroarsenate ($LiAsF_6$), lithium tetrafluoroborate ($LiBF_4$), lithium hexafluorophosphate ($LiPF_6$), lithium trifluoromethanesulfonate ($LiCF_3SO_3$), lithium bis(trifluoromethanesulfonyl)imide (LiTFSI), methyl lithium tris(trifluoromethanesulfonyl) ($LiC(CF_3SO_2)_3$), and lithium bis(oxalate)borate (LiBOB).

According to one aspect of the present invention, the solvent includes one or more of 1-ethyl-3-methylimidazolium bis(trifluoromethanesulfonyl)imide, 1-ethyl-3-methylimidazolium tetrafluoroborate, propylene carbonate (PC), ethylene carbonate (EC), diethyl carbonate (DEC), and dimethyl carbonate (DMC).

According to one aspect of the present invention, the additive includes one or more of polyethylene oxide (PEO), polyethylene carbonate (PEC), poly(trimethylene carbonate) (PTMC), poly(propylene carbonate) (PPC), polysiloxane fluoromethyl carbonate, fluoroethylene carbonate, vinylene carbonate (VC), lithium lanthanum zirconium oxide (LLZO), lithium lanthanum zirconium tantalum oxide (LLZTO), lithium lanthanum titanium oxide (LLTO), alumina ($Al_2O_3$), zirconia ($ZrO_2$).

According to one aspect of the present invention, the positive electrode active material includes one or more of lithium iron phosphate ($LiFePO_4$), lithium cobalt phosphate ($LiCoPO_4$), lithium iron silicate ($Li_2FeSiO_4$), $LiMO_2$ (M=Ni, Mn, Co), nickel-cobalt-manganese ternary layered material (NMC), nickel-cobalt-aluminum ternary material (NCA).

According to one aspect of the present invention, the negative active material includes one or more of graphite, silicon, silicon oxide, and lithium titanate.

Compared with traditional lithium ion batteries, the battery of the present invention has better safety performance, even if it is punctured by the steel needling, thereby supplying power stably. Compared with the all-solid-state batteries, the battery of the present invention has better rate performance and can be used at high temperature, and can still work normally even at 60° C.-80° C.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention.

DETAILED DESCRIPTION OF THE INVENTION

Figure 1:
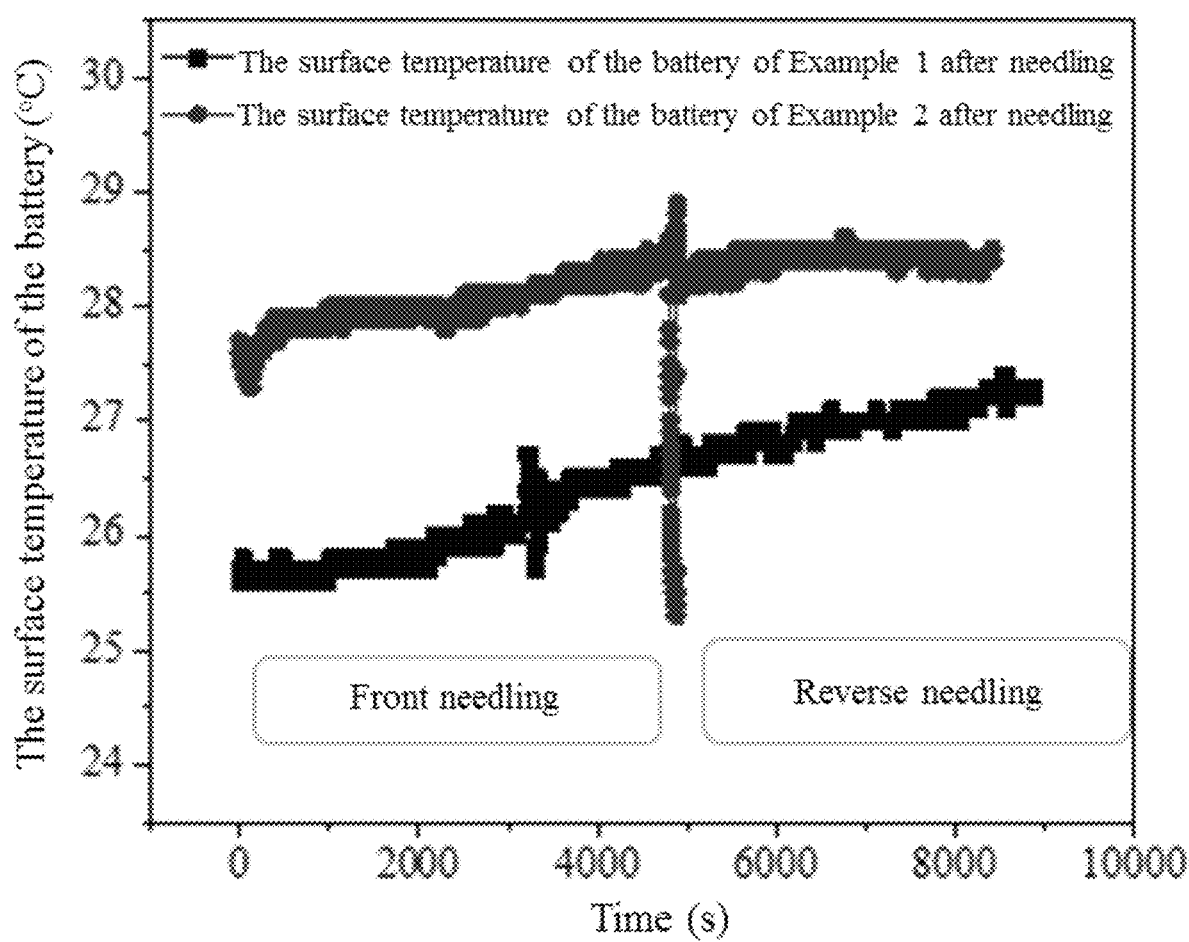
FIG. 1 depicts a graph showing the surface temperature of batteries of Example 1 and Example 2 during the needling process.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

Example 1

Figure 4:
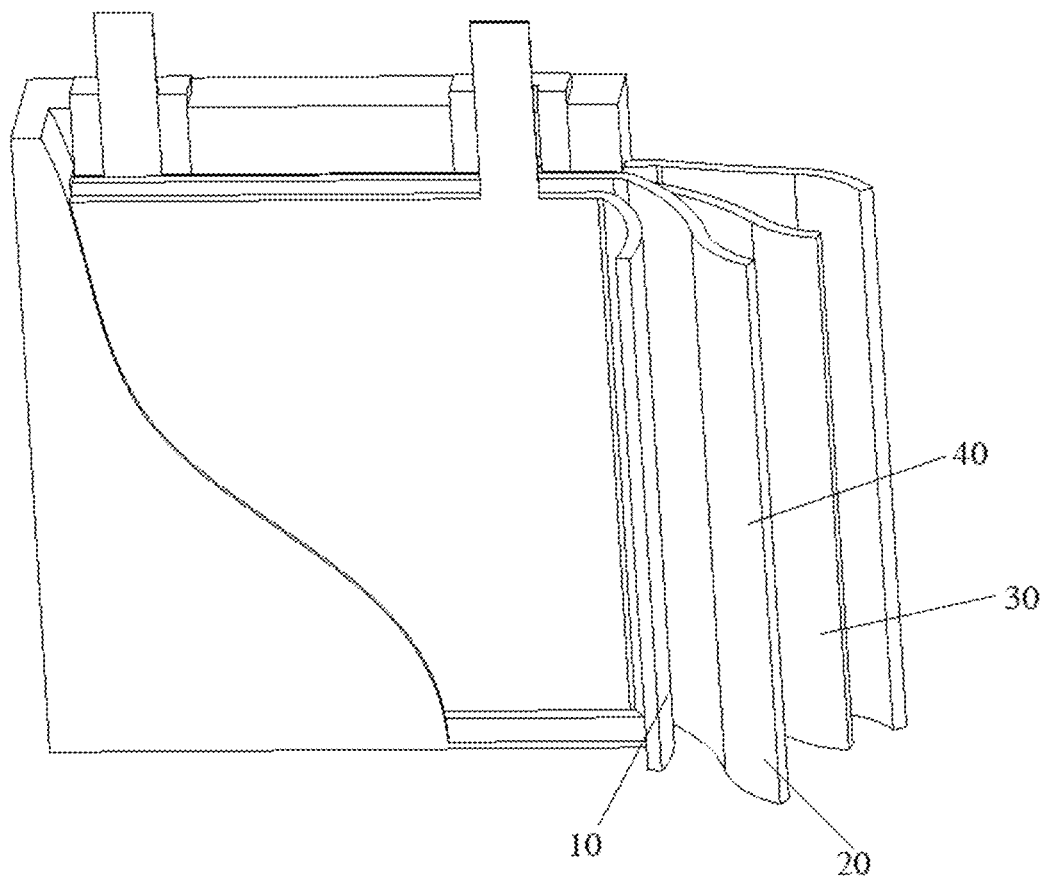
FIG. 4 depicts a perspective view of a lithium ion battery according to one embodiment of the present invention.

Referring to FIG. 4, a lithium ion battery according to Example 1 of the present invention includes a lithium ion battery body. The lithium ion battery body includes a positive electrode sheet 10, a separator 20, a cushion rubber 40 and a solid-state negative electrode sheet 30. The positive electrode sheet 10 and the solid-state negative electrode sheet 30 are provided at upper and lower surfaces of the separator 20, and the cushion rubber 40 is located in the positive electrode sheet 10 and the separator 20.

In Example 1, the separator is a polyolefin-containing separator, for instance a single-layer separator of PP, a single-layer separator of PE, a separator of PP coated with ceramic, a separator of PE coated with ceramic, a double-layer separator of PP/PE, a double-layer separator of PP/PP, or a triple-layer separator of PP/PE/PP.

The method for preparing the lithium ion battery includes the steps of:

(1) coating a cushion rubber on the positive electrode sheet, and the cushion rubber infiltrating into the positive electrode sheet, wherein a mass ratio of the cushion rubber to the positive electrode sheet is 25%;

(2) attaching the separator to the coated cushion rubber and putting the separator coated with cushion rubber on the positive electrode sheet, and the cushion rubber infiltrating into the separator, wherein a mass ratio of the cushion rubber to the separator is 120%; and (3) attaching a solid-state negative electrode sheet to the separator to form a lithium ion battery body;

wherein preparation of the positive electrode sheet includes the steps of:

i) weighing lithium iron phosphate ($LiFePO_4$) and lithium cobalt phosphate ($LiCoPO_4$), Super P, polyvinylidene fluoride according to a mass ratio of 80-99:0.5-10:0.5-10, preferably the mass ratio of lithium iron phosphate, lithium cobalt phosphate, Super P, polyvinylidene fluoride is 92:3:3:2;

ii) mixing lithium iron phosphate ($LiFePO_4$), Super P, polyvinylidene fluoride in a solvent of N-methylpyrrolidone, stirring to form a uniform positive electrode slurry having a solid content of 50%;

iii) coating the positive electrode slurry obtained in step 2) onto an aluminum foil or a carbon coated aluminum foil having a thickness of 12 μm to obtain a positive electrode sheet, drying the positive electrode sheet at a temperature of 110° C. and a transport speed of 0.5 m/min, and obtaining the positive electrode sheet after rolling and cutting;

wherein preparation of the solid-state negative electrode sheet includes the steps of:

i) weighing graphite and silicon, Super P, polyethylene oxide (PEO), lithium bis(trifluoromethanesulfonyl)imide (LiTFSI), polyvinylidene fluoride according to a mass ratio of 80-90:1-5:5-12:2-10:2-5, preferably the mass ratio of graphite, silicon, Super P, polyethylene oxide (PEO), lithium bis(trifluoromethanesulfonyl)imide (LiTFSI), polyvinylidene fluoride is 75:5:1:12:2:5;

ii) mixing graphite, silicon, Super P, polyethylene oxide, LiTFSI, polyvinylidene fluoride in a solvent of N-methyl pyrrolidone, stirring to form a uniform negative electrode slurry having a solid content of 60%;

iii) coating the slurry obtained in step ii) onto a copper foil having a thickness of 8 μm to obtain a negative electrode sheet, drying the negative electrode sheet at a temperature of 90° C. and a transport speed of 0.5 m/min, and obtaining the solid-state negative electrode sheet after rolling and cutting; and wherein preparation of the cushion rubber includes the steps of, mixing the solvent, the lithium salt and the additive according to a mass ratio of (80-90):(5-15):(1-10), fully stirring and obtaining the cushion rubber, preferably, the materials and the mass ratio is: 1-ethyl-3-methylimidazolium bis(trifluoromethanesulfonyl)imide:propylene carbonate (PC):ethylene carbonate (EC):lithium bis(trifluoromethanesulfonyl)imide (LiTFSI):vinylene carbonate (VC):polyethylene oxide (PEO) is 20:30:30:10:5:5.

A rate performance of the battery was tested at a temperature of 25±2° C., the charging rate was 0.5 C, the discharging rates were 0.2 C, 0.5 C, 1 C, 2 C, respectively, the voltage range was 2.2-3.7V.

The discharge specific capacity of the battery at 0.2 C, 0.5 C, 1 C, 2 C was 139 mAh/g, 138 mAh/g, 137 mAh/g, 135 mAh/g, respectively.

Referring to FIG. 1, a needling safety test is performed on the battery. Firstly, the battery is subjected to a needling step, the maximum temperature rise on the battery surface does not exceed 3° C. during the process, then the battery is reversed by 180° and the battery is subjected to a needling step again from the reverse side, the maximum temperature rise on the battery surface does not exceed 3° C. during the process.

Example 2

Referring to FIG. 4, the lithium ion battery in Example 2 of the present invention includes a lithium ion battery body. The lithium ion battery body includes a positive electrode sheet 10, a separator 20, a cushion rubber 40 and a solid-state negative electrode sheet 30. The positive electrode sheet 10 and the solid-state negative electrode sheet 30 are provided at upper and lower surfaces of the separator 20, and the cushion rubber 40 is located in the positive electrode sheet 10 and the separator 20.

In Example 2, the separator is a polyolefin-containing separator, such as a single-layer separator of PP, a single-layer separator of PE, a separator of PP coated with ceramic, a separator of PE coated with ceramic, a double-layer separator of PP/PE, a double-layer separator of PP/PP, a triple-layer separator of PP/PE/PP.

The method for preparing the lithium ion battery includes the steps of:
(1) coating a cushion rubber on a positive electrode sheet, and the cushion rubber infiltrating into the positive electrode sheet, wherein a mass ratio of the cushion rubber and the positive electrode sheet is 10%;
(2) attaching a separator to the coated cushion rubber and putting the separator coated with cushion rubber on the positive electrode sheet, and the cushion rubber infiltrating into the separator, wherein a mass ratio of the cushion rubber and the separator is 80%; and
(3) attaching the solid-state negative electrode sheet to the separator to form a lithium ion battery body;
wherein preparation of the positive electrode sheet includes the steps of:
i) weighing nickel-cobalt-manganese ternary layered material (NMC523), Super P, polyvinylidene fluoride according to a mass ratio of (80-99):(0.5-10):(0.5-10), preferably, the mass ratio is 80:10:10;
ii) mixing nickel-cobalt-manganese ternary layered material (NMC523), Super P, polyvinylidene fluoride in a solvent of N-methylpyrrolidone, stirring to form a uniform positive electrode slurry having a solid content of 65%;
iii) coating the positive electrode slurry obtained in step 2) onto an aluminum foil or a carbon coated aluminum foil having a thickness of 25 μm to obtain a positive electrode sheet, drying the positive electrode sheet at a temperature of 150° C. and a transport speed of 20 m/min, and obtaining the positive electrode sheet after rolling and cutting;
wherein preparation of the solid-state negative electrode sheet includes the steps of:

i) weighing lithium titanate, Super P, alumina ($Al_2O_3$) and polypropylene carbonate (PPC), lithium bis(oxalate) borate (LiBOB), polyvinylidene fluoride according to a mass ratio of 80-90:1-5:5-12:2-10:2-5, preferably the mass ratio of lithium titanate, Super P, alumina ($Al_2O_3$), polypropylene carbonate (PPC), lithium bis(oxalate) borate (LiBOB), polyvinylidene fluoride is 84:5:2:3:3:3;
ii) mixing lithium titanate, Super P, alumina ($Al_2O_3$), polypropylene carbonate (PPC), lithium bis(oxalate) borate (LiBOB), polyvinylidene fluoride in a solvent of N-methyl pyrrolidone, stirring to form a uniform negative electrode slurry having a solid content of 50%;
iii) coating the slurry obtained in step ii) onto a copper foil having a thickness of 25 μm to obtain a negative electrode sheet, drying the negative electrode sheet at a temperature of 130° C. and a transport speed of 20 m/min, and obtaining the solid-state negative electrode sheet after rolling and cutting; and
wherein preparation of the cushion rubber includes the steps of: mixing the solvent, the lithium salt and the additive according to a mass ratio of (80-90):(5-15):(1-10), fully stirring and obtaining the cushion rubber, preferably, the materials and the mass ratio is: propylene carbonate (PC):lithium bis(trifluoromethanesulfonyl)imide (LiTFSI):lithium tetrafluoroborate ($LiBF_4$):poly(trimethylene carbonate) (PTMC) is 82:10:5:3.

A rate performance of the battery was tested at a temperature of 60° C.-80° C., the charging rate was 0.5 C, the discharging rates were 0.2 C, 0.5 C, 1 C, 2 C, respectively, and the voltage range was 1.4-2.8V.

Figure 3:
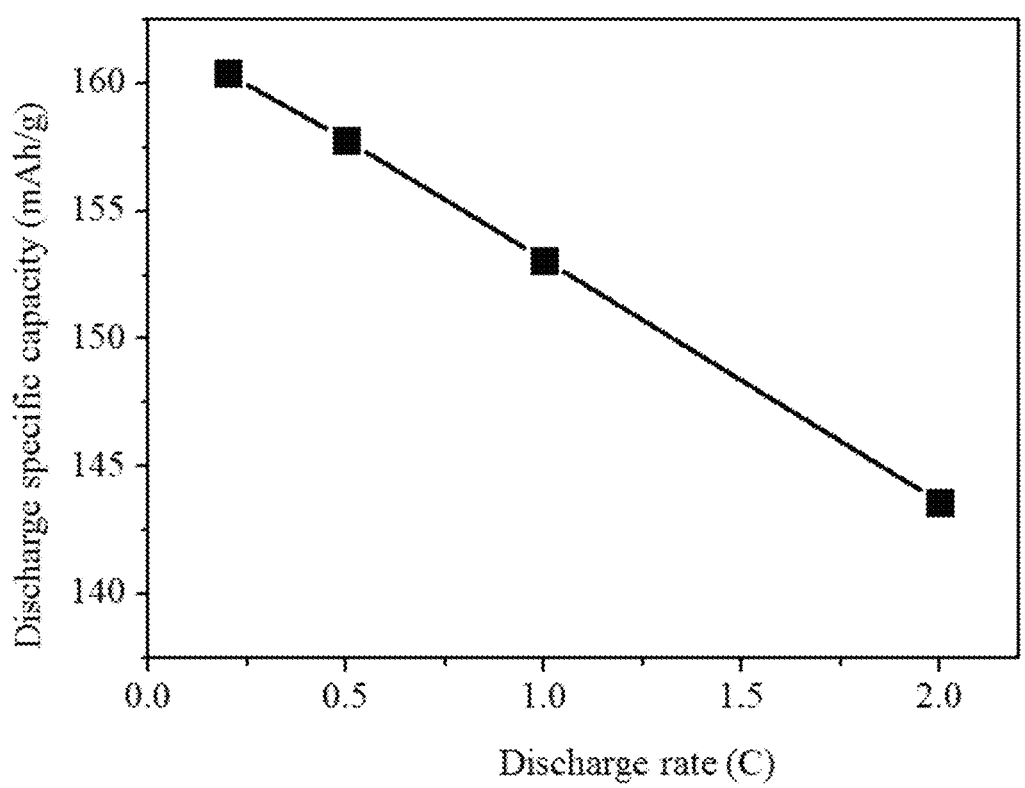
FIG. 3 depicts a graph showing a rate performance of the battery of Example 2.

Referring to FIG. 3, the discharge specific capacity of the battery at 0.2 C, 0.5 C, 1 C, 2 C was 161 mAh/g, 157 mAh/g, 152 mAh/g, 143 mAh/g, respectively.

Referring to FIG. 1, a needling safety test is performed on the battery. Firstly, the battery is subjected to a needling step, and the maximum temperature rise on the battery surface does not exceed 3° C. during the process. Then the battery is reversed by 180° and the battery is subjected to a needling step again from the reverse side, and the maximum temperature rise on the battery surface does not exceed 3° C. during the process.

Example 3

Referring to FIG. 4, the lithium ion battery in Example 3 of the present invention includes a lithium ion battery body. The lithium ion battery body includes a positive electrode sheet 10, a separator 20, a cushion rubber 40 and a solid-state negative electrode sheet 30. The positive electrode sheet 10 and the solid-state negative electrode sheet 30 are provided at upper and lower surfaces of the separator 20, and the cushion rubber 40 is located in the positive electrode sheet 10 and the separator 20.

In Example 3, the separator is a polyolefin-containing separator, such as a single-layer separator of PP, a single-layer separator of PE, a separator of PP coated with ceramic, a separator of PE coated with ceramic, a double-layer separator of PP/PE, a double-layer separator of PP/PP, a triple-layer separator of PP/PE/PP.

The method for preparing the lithium ion battery includes the steps of:
(1) coating a cushion rubber on a positive electrode sheet, and the cushion rubber infiltrating into the positive electrode sheet, wherein the mass ratio of the cushion rubber and the positive electrode sheet is 2%;
(2) attaching a separator to the coated cushion rubber and putting the separator coated with cushion rubber on the positive electrode sheet, the cushion rubber infiltrating into the separator, a mass ratio of the cushion rubber and the separator is 30%; and (3) attaching a solid-state negative electrode sheet to the separator to form the desired lithium ion battery body;

wherein preparation of the positive electrode sheet includes the steps of:

i) weighing the lithium cobaltate ($LiCoO_2$), Super P, polyvinylidene fluoride according to a mass ratio of (80-99):(0.5-10):(0.5-10), preferably, the mass ratio is 99:0.5:0.5;

ii) mixing lithium cobaltate ($LiCoO_2$), Super P, polyvinylidene fluoride in a solvent of N-methylpyrrolidone, stirring to form a uniform positive electrode slurry having a solid content of 80%;

iii) coating the positive electrode slurry obtained in step 2) onto an aluminum foil or a carbon coated aluminum foil having a thickness of 6 μm to obtain a positive electrode sheet, drying the positive electrode sheet at a temperature of 130° C. and a transport speed of 10 m/min, and obtaining the positive electrode sheet after rolling and cutting;

wherein preparation of the solid-state negative electrode sheet includes the steps of:

i) weighing silicon oxide, Super P, polyethylene oxide (PEO) and lithium lanthanum zirconium oxide (LLZO), lithium trifluoromethanesulfonate ($LiCF_3SO_3$) and lithium bis(oxalate) borate (LiBOB), polyvinylidene fluoride according to a mass ratio of 80-90:1-5:5-12:2-10:2-5, preferably the mass weigh ratio of silicon oxide, Super P, polyethylene oxide (PEO), lithium lanthanum zirconium oxide (LLZO), lithium trifluoromethanesulfonate ($LiCF_3SO_3$), lithium bis(oxalate) borate (LiBOB), polyvinylidene fluoride is 82:1:2:3:5:5:2;

ii) mixing silicon oxide, Super P, polyethylene oxide (PEO), lithium lanthanum zirconium oxide (LLZO), lithium trifluoromethanesulfonate ($LiCF_3SO_3$), lithium bis(oxalate) borate (LiBOB), polyvinylidene fluoride in a solvent of N-methyl pyrrolidone, stirring to form a uniform negative electrode slurry having a solid content of 30%; and iii) coating the slurry obtained in step ii) onto a copper foil having a thickness of 16 μm to obtain a negative electrode sheet, drying the negative electrode sheet at a temperature of 110° C. and a transport speed of 10 m/min, and obtaining the solid-state negative electrode sheet after rolling and cutting; and wherein preparation of the cushion rubber includes the step of mixing the solvent, the lithium salt and the additive according to a mass ratio of (80-90):(5-15):(1-10), fully stirring and obtaining the cushion rubber, preferably, the materials and the mass ratio is: 1-ethyl-3-methylimidazolium tetrafluoroborate:diethyl carbonate (DEC):dimethyl carbonate (DMC):lithium perchlorate ($LiClO_4$):polyethylene oxide (PEO) is 10:30:50:5:5.

A rate performance of the battery was tested at a temperature of 25±2° C., the charging rate was 0.5 C, the discharging rates were 0.2 C, 0.5 C, 1 C, 2 C, respectively, and the voltage range was 3-4.2V.

The discharge specific capacity of the battery at 0.2 C, 0.5 C, 1 C, 2 C was 143 mAh/g, 141 mAh/g, 140 mAh/g, 138 mAh/g, respectively.

Figure 2:
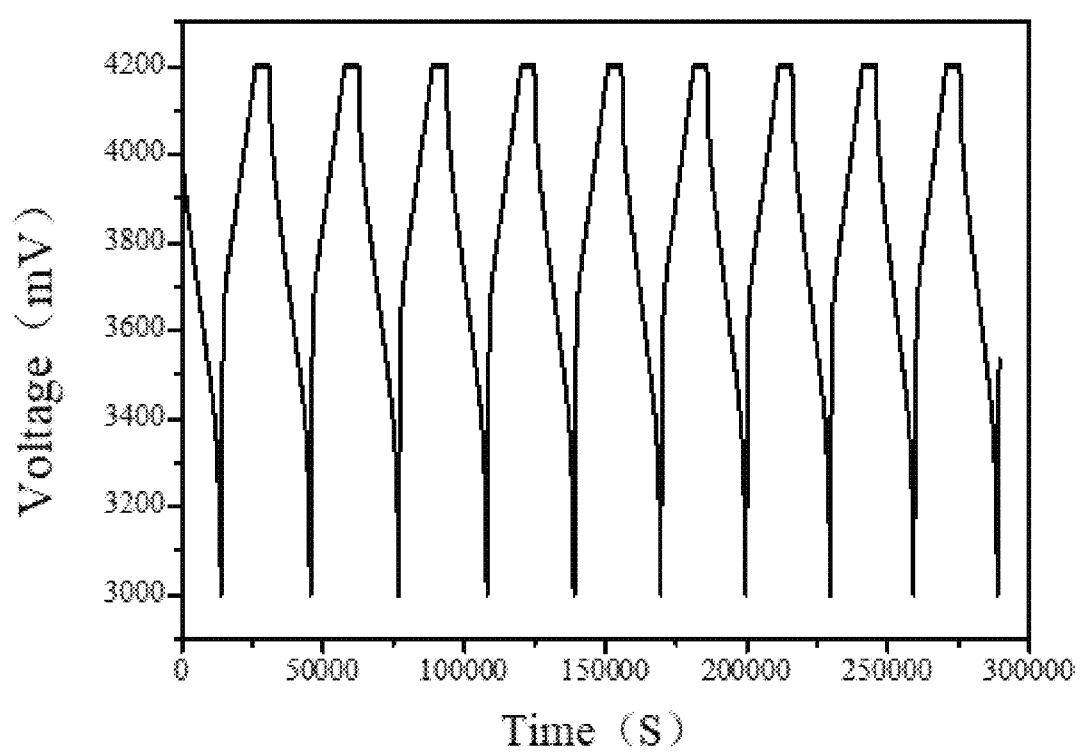
FIG. 2 depicts a charging-discharging curve of the battery of Example 3 after two needling processes.

A needling safety test is performed on the battery, after two needling passes, the steel needle remains inside the battery and the battery can still perform normal charging and discharging test. The charging-discharging curves are shown in FIG. 2.

Compared with the traditional lithium ion batteries, the battery of the present invention has better safety performance, even if it is punctured by the steel needling, and the battery can supply power stably. Compared with the all-solid-state batteries, the battery has better rate performance, can be used at high temperature, and can still work normally even at 60° C.-80° C.

While the present invention has been illustrated by the above description of the preferred embodiments thereof, while the preferred embodiments have been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A method for preparing a lithium ion battery, wherein the lithium ion battery comprises a lithium ion battery body, the lithium ion battery body comprises a positive electrode sheet, a separator, a cushion rubber and a solid-state negative electrode sheet, the positive electrode sheet and the solid-state negative electrode sheet are provided at upper and lower surfaces of the separator, and the cushion rubber is located in the positive electrode sheet and the separator, the method comprises the steps of:

(1) coating a cushion rubber on a positive electrode sheet and the cushion rubber infiltrating into the positive electrode sheet, wherein a mass ratio of the cushion rubber to the positive electrode sheet is 2%-25%;

(2) attaching a separator to the coated cushion rubber and putting the separator coated with the cushion rubber on the positive electrode sheet, and the cushion rubber infiltrating into the separator, wherein a mass ratio of the cushion rubber to the separator is 30%-120%;

(3) attaching a solid-state negative electrode sheet to the separator to form a lithium ion battery body;

wherein preparation of the positive electrode sheet comprising the steps of:

i) weighing a positive active material, Super P, polyvinylidene fluoride according to a mass ratio of (80-99):(0.5-10):(0.5-10);

ii) mixing the positive electrode active material, Super P, polyvinylidene fluoride in a solvent of N-methylpyrrolidone, stirring to form a uniform positive electrode slurry having a solid content of 50%-80%;

iii) coating the positive electrode slurry obtained in step 2) onto an aluminum foil or a carbon coated aluminum foil having a thickness of 6-25 μm to obtain a positive electrode sheet, drying the positive electrode sheet at a temperature of 110° C.-150° C. and a transport speed of 0.5-20 m/min, and obtaining the positive electrode sheet after rolling and cutting;

wherein preparation of the solid-state negative electrode sheet comprising the steps of:

i) weighing a negative electrode active material, Super P, an additive, a lithium salt and polyvinylidene fluoride according to a mass ratio of (80-90):(1-5):(5-12):(2-10):(2-5);

ii) mixing the negative electrode active material, Super P, the additive, the lithium salt, polyvinylidene fluoride in a solvent of N-methyl pyrrolidone, stirring to form a uniform negative electrode slurry having a solid content of 30%-60%;

iii) coating the slurry obtained in step ii) onto a copper foil having a thickness of 6-25 μm to obtain a negative electrode sheet, drying the negative electrode sheet at a temperature of 90° C.-130° C. and a transport speed of 0.5-20 m/min, and obtaining the solid-state negative electrode sheet after rolling and cutting;

wherein preparation of the cushion rubber comprising the step of mixing a solvent, the lithium salt and an additive according to a mass ratio of (80-90):(5-15):(1-10), fully stirring and obtaining the cushion rubber.

2. The method of claim 1, wherein the lithium salt comprises one or more of lithium perchlorate ($LiClO_4$), lithium hexafluoroarsenate ($LiAsF_6$), lithium tetrafluoroborate ($LiBF_4$), lithium hexafluorophosphate ($LiPF_6$), lithium trifluoromethanesulfonate ($LiCF_3SO_3$), lithium bis(trifluoromethanesulfonyl)imide (LiTFSI), methyl lithium tris(trifluoromethanesulfonyl) ($LiC(CF_3SO_2)_3$), and lithium bis(oxalate)borate (LiBOB).

3. The method of claim 1, wherein the solvent comprises one or more of 1-ethyl-3-methylimidazolium bis(trifluoromethanesulfonyl)imide, 1-ethyl-3-methylimidazolium tetrafluoroborate, propylene carbonate (PC), ethylene carbonate (EC), diethyl carbonate (DEC), and dimethyl carbonate (DMC).

4. The method of claim 1, wherein the additive comprises one or more of polyethylene oxide (PEO), polyethylene carbonate (PEC), poly(trimethylene carbonate) (PTMC), poly(propylene carbonate) (PPC), polysiloxane fluoromethyl carbonate, fluoroethylene carbonate, vinylene carbonate (VC), lithium lanthanum zirconium oxide (LLZO), lithium lanthanum zirconium tantalum oxide (LLZTO), lithium lanthanum titanium oxide (LLTO), alumina ($Al_2O_3$), and zirconia ($ZrO_2$).

5. The method of claim 1, wherein the positive electrode active material comprises one or more of lithium iron phosphate ($LiFePO_4$), lithium cobalt phosphate ($LiCoPO_4$), lithium iron silicate ($Li_2FeSiO_4$), $LiMO_2$ (M=Ni, Mn, Co), nickel-cobalt-manganese ternary layered material (NMC), and nickel-cobalt-aluminum ternary material (NCA).

6. The method of claim 1, wherein the negative active material comprises one or more of graphite, silicon, silicon oxide, and lithium titanate.

7. The method of claim 1, wherein the separator is a polyolefin-containing separator, a double-layer separator of PP/PE, a double-layer separator of PP/PP, or a triple-layer separator of PP/PE/PP.

\* \* \* \* \*